United States Patent
Chen

(10) Patent No.: US 10,303,485 B2
(45) Date of Patent: May 28, 2019

(54) CONTROL METHOD FOR CONTROLLING A SERVER SYSTEM BY MEANS OF A SET OF RESET SIGNALS AND A SET OF NOTIFICATION SIGNALS

(71) Applicants: Inventec (Pudong) Technology Corp., Shanghai (CN); Inventec Corporation, Taipei (TW)

(72) Inventor: Chia-Hsiang Chen, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 278 days.

(21) Appl. No.: 15/466,874

(22) Filed: Mar. 23, 2017

(65) Prior Publication Data

US 2018/0139304 A1    May 17, 2018

(30) Foreign Application Priority Data

Nov. 17, 2016  (CN) .......................... 2016 1 1019810

(51) Int. Cl.
  *G06F 15/173* (2006.01)
  *G06F 9/4401* (2018.01)
  *G06F 9/46* (2006.01)
(52) U.S. Cl.
  CPC .............. *G06F 9/4401* (2013.01); *G06F 9/46* (2013.01)
(58) Field of Classification Search
  CPC ................................ G06F 9/4401; G06F 9/46
  USPC ........................................................ 709/223
  See application file for complete search history.

*Primary Examiner* — Wing F Chan
*Assistant Examiner* — Joseph R Maniwang
(74) *Attorney, Agent, or Firm* — Winston Hsu

(57) ABSTRACT

A control method for controlling a server system includes that a host server sends a first reset signal to a first server, the first server sends a second reset signal to a second server, and so on, till an $(n-1)_{th}$ server sends an $n_{th}$ reset signal to an $n_{th}$ server. The $n_{th}$ server performs a system boot operation of the $n_{th}$ server, then sends a first notification signal to the $(n-1)_{th}$ server. The $(n-1)_{th}$ server performs a system boot operation of the $(n-1)_{th}$ server after receiving the first notification signal, then sends a second notification signal to an $(n-2)_{th}$ server, and so on. After receiving an $(n-1)_{th}$ notification signal, the first server performs a system boot operation of the first server, then the first server sends an $n_{th}$ notification signal to the host server.

10 Claims, 8 Drawing Sheets

CONTROL METHOD FOR CONTROLLING A SERVER SYSTEM BY MEANS OF A SET OF RESET SIGNALS AND A SET OF NOTIFICATION SIGNALS

BACKGROUND OF THE INVENTION

1. Field of the Invention

The invention relates to a control method for controlling a server system, and more particularly, a control method for controlling a server system using a set of reset signals and a set of notification signals.

2. Description of the Prior Art

In prior art, a chain structure may be built by linking a host server to a plurality of cascaded external servers. For example, the chain structure is often used in a server system without blade servers. FIG. 1 illustrates a server system 100 having a chain structure according to prior art. A host server 110 may be linked to external servers 120a-120d. The external servers 120a-120d are connected sequentially in a series to form a chain structure.

The host server 110 may send reset signals Sa-Sd delivered stage by stage via interface cards of the external servers 120a-120d so that the external servers 120a-120d may enter an operation mode from a stand-by mode stage by stage. For example, functional units of the external servers may be activated stage by stage. Because the reset signals Sa-Sd may be sent stage by stage in a series, a last stage of the external servers (e.g. the server 120d) may receive the foresaid reset signal (e.g. Sd) last. Hence, it is possible that a detection time of the host server 110 has ended, but the external server 120d (i.e. a last stage of server) still has not received the reset signal Sd yet so that the functional units of the server 120d are still deactivated. The host server 110 may fail to connect to the external servers normally.

When a host server detects the existence of an external server, and the host server fails to detect the external server, the reason may be the failure of sending a reset signal. The external server may fail to be booted, and the host server may hence fail to boot the server system.

Therefore, a general solution is looked for in the field for reducing the problem of operating a server system with a chain structure.

SUMMARY OF THE INVENTION

An embodiment of the present invention discloses a control method for controlling a server system. The control method may include a host server sending a first reset signal to a first server. An $i_{th}$ server may send an $(i+1)_{th}$ reset signal to an $(i+1)_{th}$ server after the $i_{th}$ server receives an $i_{th}$ reset signal from an $(i-1)_{th}$ server. A system boot operation of an $n_{th}$ server may be performed after the $n_{th}$ server receives an $n_{th}$ reset signal. The $n_{th}$ server sends a first notification signal to an $(n-1)_{th}$ server after performing the system boot operation of the $n_{th}$ server. A system boot operation of an $(n-k)_{th}$ server may be performed after the $(n-k)_{th}$ server receives a $k_{th}$ notification signal from an $(n-k+1)_{th}$ server. The $(n-k)_{th}$ server may send a $(k+1)_{th}$ notification signal to an $(n-k-1)_{th}$ server after performing the system boot operation of the $(n-k)_{th}$ server. A system boot operation of the first server may be performed after the first server receives an $(n-1)_{th}$ notification signal from a second server. The first server may send an $n_{th}$ notification signal to the host server after performing the system boot operation of the first server.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
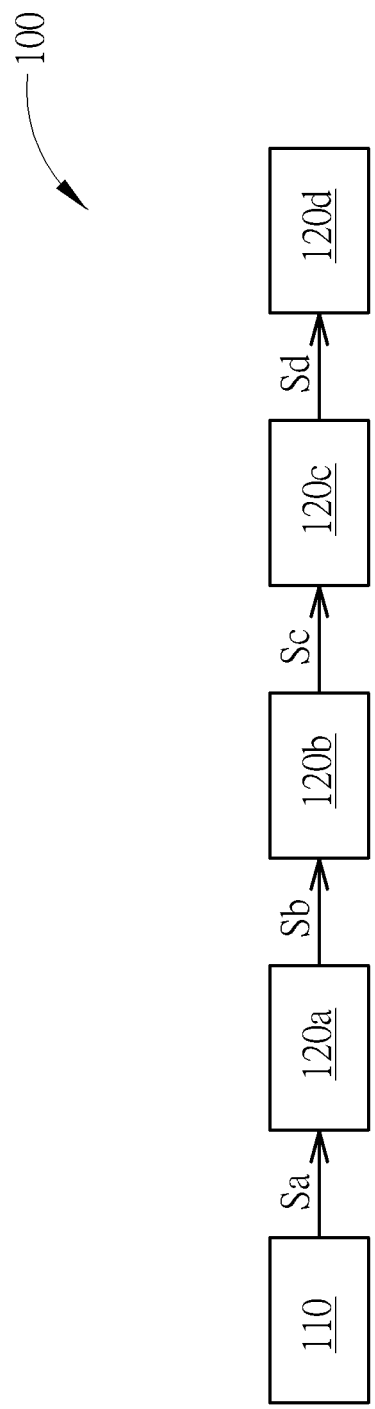
FIG. 1 illustrates a server system having a chain structure according to prior art.
Figure 2:
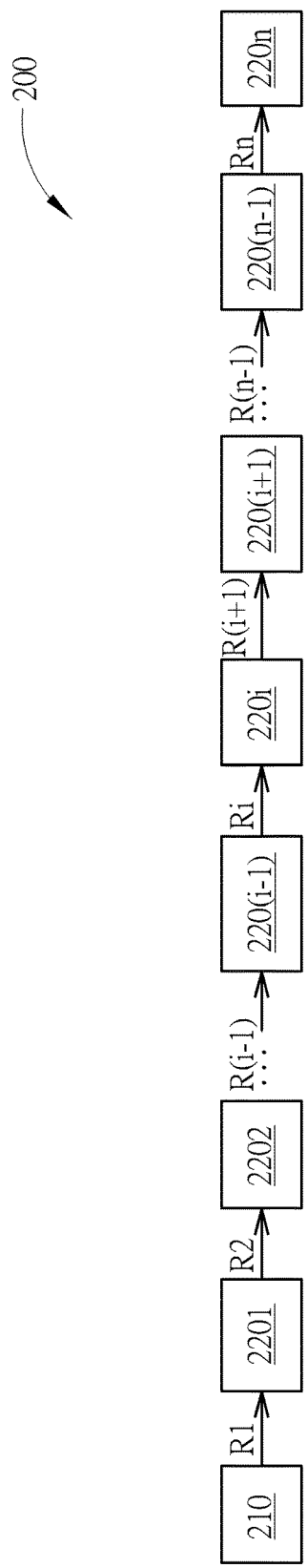
FIGS. 2-3 illustrate a server system according to an embodiment of the present invention.
Figure 3:
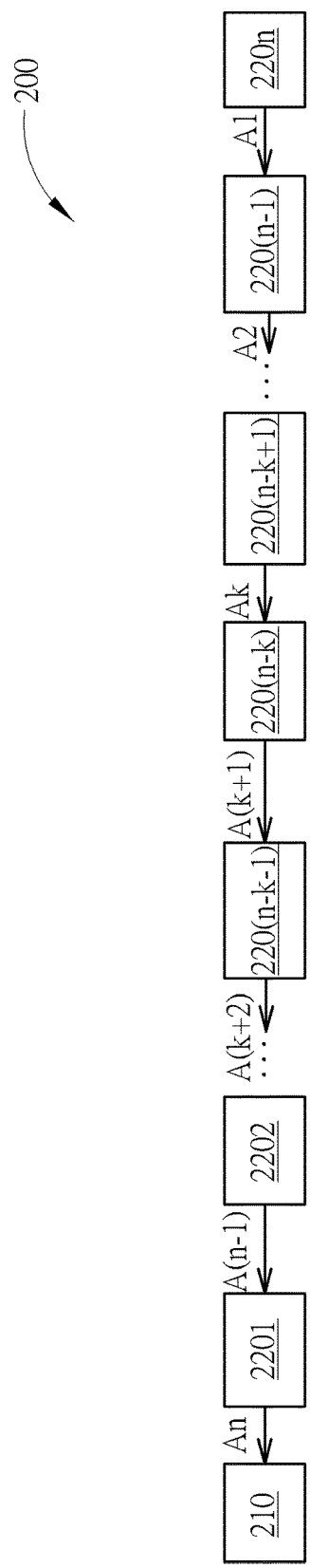

FIGS. 2-3 illustrate a server system 200 according to an embodiment of the present invention. Two figures are used here for explaining the control method described below easier. The server system 200 may include a host server 210 and n external servers 2201-220n. The server system 200 may be of a chain structure having a set of servers linked in a series. The reference numbers of the servers in FIGS. 1-2 may correspond to positions of the servers. For example, the server 2201 may be a first server linked to the host server 210. That is to say, the server 2201 is a closest external server to the host server 210 than other external servers. The server 2202 may be a second external server of the external servers, and so on.

Figure 4:
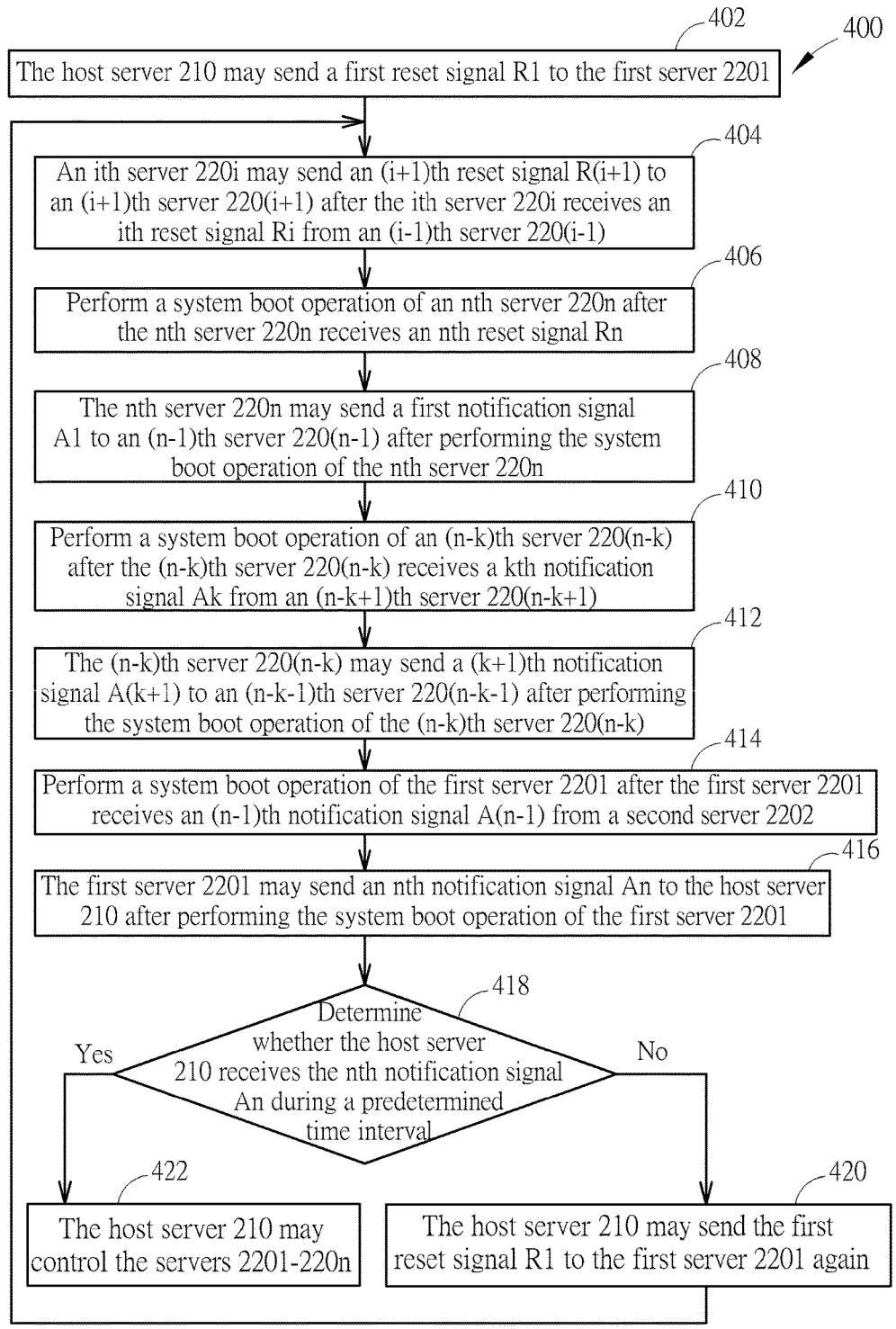
FIG. 4 illustrates a flow chart of a control method for controlling the server system of FIGS. 2-3 according to an embodiment of the present invention.

FIG. 4 illustrates a flow chart of a control method 400 for controlling the server system 200 according to an embodiment of the present invention. The control method 400 may include:

Step 402: the host server 210 may send a first reset signal R1 to the first server 2201;

Step 404: an $i_{th}$ server 220$i$ may send an $(i+1)_{th}$ reset signal R(i+1) to an $(i+1)_{th}$ server 220(i+1) after the $i_{th}$ server 220$i$ receives an $i_{th}$ reset signal Ri from an $(i-1)_{th}$ server 220(i-1);

Step 406: perform a system boot operation of an $n_{th}$ server 220$n$ after the $n_{th}$ server 220$n$ receives an $n_{th}$ reset signal Rn;

Step 408: the $n_{th}$ server 220$n$ may send a first notification signal A1 to an $(n-1)_{th}$ server 220(n-1) after performing the system boot operation of the $n_{th}$ server 220$n$;

Step 410: perform a system boot operation of an $(n-k)_{th}$ server 220(n-k) after the $(n-k)_{th}$ server 220(n-k) receives a $k_{th}$ notification signal Ak from an $(n-k+1)_{th}$ server 220(n-k+1);

Step 412: the $(n-k)_{th}$ server 220(n-k) may send a $(k+1)_{th}$ notification signal A(k+1) to an $(n-k-1)_{th}$ server 220(n-k-1) after performing the system boot operation of the $(n-k)_{th}$ server 220(n-k);

Step 414: perform a system boot operation of the first server 2201 after the first server 2201 receives an $(n-1)_{th}$ notification signal A(n-1) from a second server 2202;

Step 416: the first server 2201 may send an $n_{th}$ notification signal An to the host server 210 after performing the system boot operation of the first server 2201;

Step 418: determine whether the host server 210 receives the $n_{th}$ notification signal An during a predetermined time interval; if so, enter Step 422; else, enter Step 420;

Step 420: the host server 210 may send the first reset signal R1 to the first server 2201 again; and Step 422: the host server 210 may control the servers 2201-220n.

In the above description, 1<I<n, 0<k<(n−1), and I, k and n may be positive integers. Step 404 may correspond to the servers 2202-220(n−1) sending the reset signals R3-Rn. Steps 410-412 may correspond to the servers 220(n−1) to 2202 sending the notification signals A2 to A(n−1). Steps 402-406 may correspond to FIG. 2. Steps 408-416 may correspond to FIG. 3.

In Step 404, by substituting the parameter i, it may be described that the server 2201 sends the second reset signal R2 to the server 2202, the server 2202 sends the third reset signal R3 to the server 2203, and so on till the server 220(n−1) sends the $n_{th}$ reset signal Rn to the server 220n. The server 220i may send the $(i+1)_{th}$ reset signal R(i+1) to the server 220(i+1) correspondingly after receiving the $i_{th}$ reset signal Ri. In Step 406, since the server 220n may be a last stage of the chain structure, the system boot operation of the server 220n may be performed after receiving the $n_{th}$ reset signal Rn. The related details of the system boot operation may be described below. In Steps 408-414, each of the servers 220n to 2202 may be described to receive a notification signal from a following server, perform a system boot operation and send another notification signal to a previous server after performing the system boot operation. For example, after the server 2205 performs a system boot operation of the server 2205, the server 2205 may send a notification signal A(n−4) to the server 2204 to inform the server 2204 to perform a system boot operation of the server 2204. In this example, the variable of the notification signal A(n−4) may be obtained according to a calculation shown in Step 412. The calculation may include n−k=5, so (k+1)=(n−5+1)=(n−4). Then, the variable (n−4) may substitute for the variable (n−k) in this example. In other words, after a server performs a system boot operation, the server may inform a previous server closer to the host server to perform a system boot operation, and so on. Hence, after the server 2201 performs the system boot operation, the server 2201 may send the notification signal An to the host server 210. In Step 418, if the host server 210 receives the notification signal An during a predetermined time interval, the host server 210 may confirm that the external servers 2201-220n have finished performing the system boot operations, and Step 422 may be performed for the host server 210 to control the servers 2201-220n so that the server system 200 may be under control. According to an embodiment of the present invention, in Step 422, the host server 210 may perform a system boot operation, and control the statuses of the system boot operations of the servers 2201-220n such as controlling the release of the reset pins of the servers 2201-220n, and the statuses of the PCIe (peripheral component interconnect express) cards of the servers 2201-220n. In Step 418, the host server 210 may determine that at least one of the servers 2201-220n fails to perform the system boot operation, and activate the servers 2201-220n to perform the system boot operations again according to Steps 420, 404 and the following steps.

Regarding the predetermined time interval mentioned in Step 418, a timer may begin to count time in Step 402. The predetermined time interval maybe set longer so as to better confirm that at least one of the servers 2201-220n fails to perform the system boot operation. According to an embodiment of the present invention, the foresaid timer may be a watch-dog timer or another appropriate sort of timer.

According to an embodiment of the present invention, the foresaid system boot operation of a server may include setting a level of a reset pin of the server from an enabled level to a disabled level such as from 1 to 0 (or from 0 to 1) so that the server may enter an operation mode from a stand-by mode. This setting may be called as reset release or reset de-assertion. For example, the stand-by mode may correspond to that a control unit of the server keeps operation using a stand-by power, but functional units of the server may be annulled. The operation mode may correspond to that the control unit and the functional units of the server are supplied by a functional power, and at least one of the functional units may be activated to be accessed and operated normally. The foresaid control unit of the server may be (but not limited to) a complex programmable logic device (CPLD). The foresaid functional units may include (but not limited to) a peripheral component interconnect express (PCIe) unit, a platform controller hub (PCH) unit and/or a central processing unit (CPU). When a server fails to boot a functional unit during a system boot operation, the power may be supplied again according to a power booting sequence so as to reboot power for booting the functional unit and completing the system boot operation.

According to an embodiment of the present invention, Step 408 may be performed by the $n_{th}$ server 220n sending the first notification signal A1 to the $(n−1)_{th}$ server 220(n−1) after a predetermined time interval corresponding to the server 220n (which may be seen as an $n_{th}$ predetermined time interval) has elapsed since the $n_{th}$ server 220n has received the $n_{th}$ reset signal Rn. The $n_{th}$ predetermined time interval may be equal to or longer than an expected time interval for the server 220n to perform the system boot operation. Hence, it may be assured that the server 220n has completed the system boot operation when the server 220(n−1) receives the notification signal A1. According to another embodiment, in Step 408, the server 220n may send the first notification signal A1 to the server 220(n−1) after the foresaid predetermined time interval has elapsed since the server 220n receives the $n_{th}$ reset signal Rn and the system boot operation (e.g. booting all functional units and generating checking signals using a digital circuit) of the server 220n is performed and confirmed. This may better assure that the server 220n has completed the system boot operation.

Likewise, according to an embodiment of the present invention, in Step 412, the $(n−k)_{th}$ server 220(n−k) may send the $(k+1)_{th}$ notification signal A(k+1) after an predetermined time interval corresponding to the server 220(n−k) (which may be seen as an $(n−k)_{th}$ predetermined time interval) has elapsed since the server 220(n−k) receives the $k_{th}$ notification signal Ak. This is for assuring that the server 220(n−k) has completed the system boot operation when the server 220(n−k−1) receives the notification signal A(k+1). The $(n−k)_{th}$ predetermined time interval may be set longer than an expected time interval for the server 220(n−k) to perform the corresponding system boot operation. According to another embodiment, Step 412 may include the $(n−k)_{th}$ server 220(n−k) sending the $(k+1)_{th}$ notification signal A(k+1) after the $(n−k)_{th}$ predetermined time interval has elapsed since the server 220(n−k) receives the $k_{th}$ notification signal Ak, and the system boot operation of the server 220(n−k) is confirmed to be performed. The system boot operation may be confirmed using checking signals. This may further assure that the system boot operation of the server 220(n−k) is performed. The said server 220(n−k) may be each of the servers 2202-220(n−1) shown in FIGS. 2-3.

Likewise, in Step 416, the server 2201 may send the $n_{th}$ notification signal An to the host server 210 after a first time interval corresponding to the server 2201 has elapsed since the server 2201 receives the $(n-1)_{th}$ notification signal A(n−1). According to another embodiment, Step 416 may include the server 2201 sending the $n_{th}$ notification signal An after the first time interval has elapsed since the server 2201 receives the $(n-1)_{th}$ notification signal A(n−1) and the system boot operation of the server 2201 has been confirmed to be performed. The system boot operation of the server 2201 may be confirmed by generating and using a checking signal, or using other confirmation means practicable on an electric circuit.

The foresaid $n_{th}$ predetermined time interval, the $(n-k)_{th}$ predetermined time interval and the $n_{th}$ time interval may be measured by counting time using watch-dog timers set in the servers.

Figure 5:
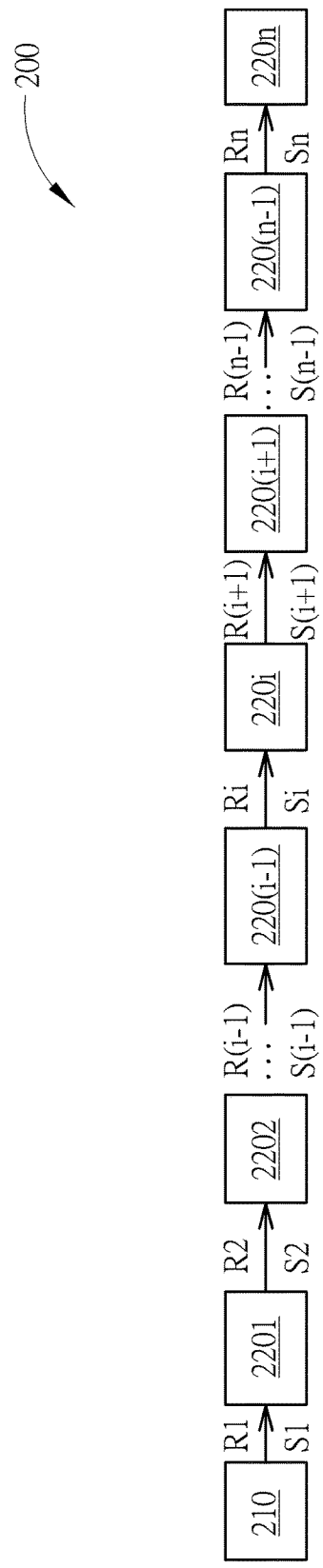
FIGS. 5-6 illustrates a server system according to another embodiment of the present invention.
Figure 6:
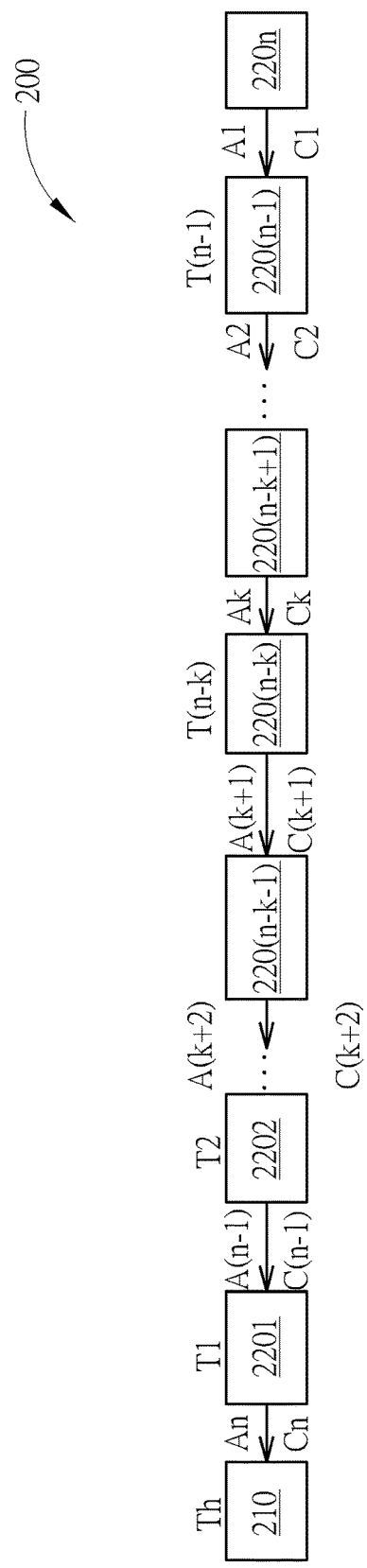
Figure 7:
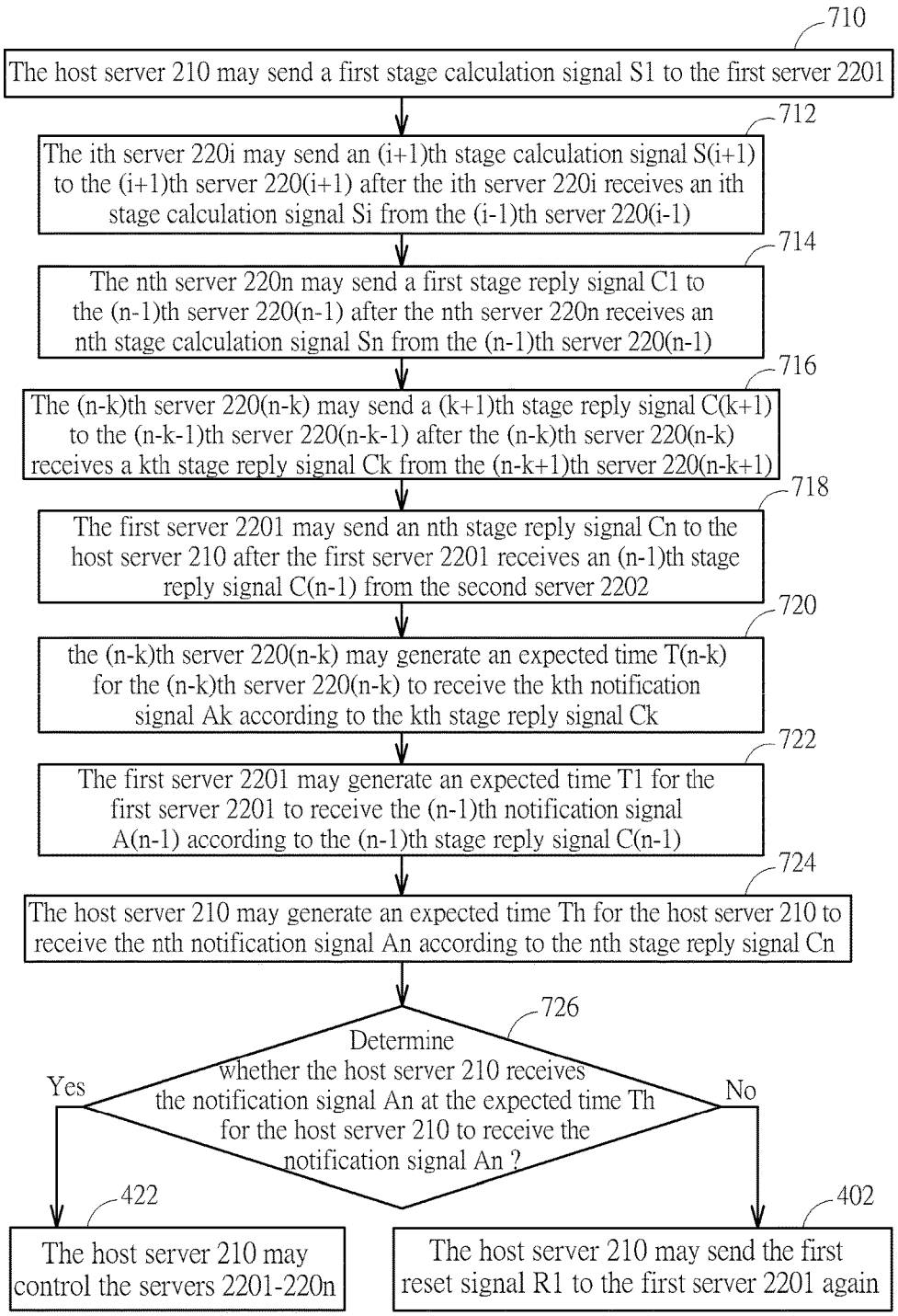
FIG. 7 illustrates extra steps that may be further included by the method of FIG. 4.

FIGS. 5-6 illustrate the server system 200 according to another embodiment of the present invention. FIGS. 5-6 may be read with reference to FIG. 7. FIG. 7 illustrates extra steps that may be further included by the method 400 according to another embodiment of the present invention. The method 400 may further include:

Step 710: the host server 210 may send a first stage calculation signal S1 to the first server 2201;

Step 712: the $i_{th}$ server 220$i$ may send an $(i+1)_{th}$ stage calculation signal S(i+1) to the $(i+1)_{th}$ server 220(i+1) after the $i_{th}$ server 220$i$ receives an $i_{th}$ stage calculation signal Si from the $(i-1)_{th}$ server 220(i−1);

Step 714: the $n_{th}$ server 220$n$ may send a first stage reply signal C1 to the $(n-1)_{th}$ server 220(n−1) after the $n_{th}$ server 220$n$ receives an $n_{th}$ stage calculation signal Sn from the $(n-1)_{th}$ server 220(n−1);

Step 716: the $(n-k)_{th}$ server 220(n−k) may send a $(k+1)_{th}$ stage reply signal C(k+1) to the $(n-k-1)_{th}$ server 220(n−k−1) after the $(n-k)_{th}$ server 220(n−k) receives a $k_{th}$ stage reply signal Ck from the $(n-k+1)_{th}$ server 220(n−k+1);

Step 718: the first server 2201 may send an $n_{th}$ stage reply signal Cn to the host server 210 after the first server 2201 receives an $(n-1)_{th}$ stage reply signal C(n−1) from the second server 2202;

Step 720: the $(n-k)_{th}$ server 220(n−k) may generate an expected time T(n−k) for the $(n-k)_{th}$ server 220(n−k) to receive the $k_{th}$ notification signal Ak according to the $k_{th}$ stage reply signal Ck;

Step 722: the first server 2201 may generate an expected time T1 for the first server 2201 to receive the $(n-1)_{th}$ notification signal A(n−1) according to the $(n-1)_{th}$ stage reply signal C(n−1);

Step 724: the host server 210 may generate an expected time Th for the host server 210 to receive the $n_{th}$ notification signal An according to the $n_{th}$ stage reply signal Cn; and Step 726: determine whether the host server 210 receives the notification signal An at the expected time Th for the host server 210 to receive the notification signal An; if so, enter Step 422; else, enter Step 402.

Steps 710-712 may be read by referring to FIG. 5. Steps 714-726 may be read by referring to FIG. 6. In Steps 710-726, the relationships of the variables may be 1<i<n, and 0<k<(n−1), and the variables i, k and n may be positive integers. Therefore, the server 220(n−k) in Step 720 may correspond to each of the servers 2202-220(n−1) in FIGS. 6-7.

According to an embodiment of the present invention, Step 710 may be performed before or after Step 402. Another path (such as a path via another data bus or other input/output ports) different from the path for sending the first reset signal R1, may be used to send the stage calculation signal S1 so that Steps 710 and 402 may be performed concurrently. Steps 710-726 may be performed so that each server may know what stage number corresponding to the server itself in the chain structure of the server system.

Figure 8:
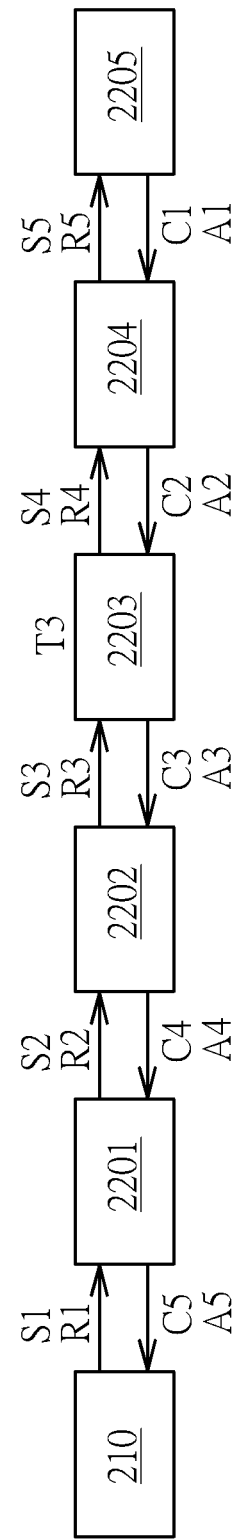
FIG. 8 illustrates an example of setting the variable n of the server system in FIGS. 5-6 as 5.

FIG. 8 illustrates an example of setting the variable n of the server system 200 in FIGS. 5-6 as 5. FIG. 8 may be used for an easier explanation. For example, when there are five (i.e. the variable n being set as 5 as above) external servers, the host server 210 may linked to the five servers 2201-2205 externally. According to the flowchart shown in FIG. 7, the stage calculation signals S1-S5 may be sent to the servers 2201-2205 respectively and sequentially, and the stage reply signals C1-C5 may be sent back from the servers 2205-2201 stage by stage so that the host server 210 may receive the stage reply signal C5. Regarding the stage reply signals C1-C5, the format of each stage reply signal may be a set of codes, and a header of each stage reply signal may be added by one stage by stage. Hence, for example, when the server 2203 receives the stage reply signal C2, a control unit (e.g. a complex programmable logic device, also known as CPLD) may recognize that the server 2203 is of a third stage in five stages of external servers. The control unit of the server 2203 may estimate a reasonable time interval for the server 2203 to receive the notification signal A2. The reasonable time interval may be calculated by referring to a time point of sending the reset signal R4, the expected time intervals for the servers 2204-2205 to perform system boot operations, and a reasonable time margin. Time T3 expected for the server 2203 to receive the notification signal A2 may be obtained. Time T3 may be (but not limited to) an expected time point.

According to an embodiment of the present invention, the server 220(n−k) may perform the system boot operation of the server 220(n−k) if the server 220(n−k) fails to receive the $k_{th}$ notification signal Ak at the expected time for the server 220(n−k) to receive the signal Ak (which may be represented as a time T(n−k)). In the example of FIG. 8, if the server 2203 fails to receive the notification signal A2 at time T3, it may be determined that the system boot operation(s) of the server 2204 and/or the server 2205 may fail. Although the server 2203 fails to receive the notification signal A2, the server 2203 may still perform the system boot operation and send the notification signal A3 to the server 2202 after performing the system boot operation. If the system boot operations of the servers 2202 and 2201 are performed successfully, the notification signal A5 may be sent to the host server 210 successfully so that the host server 210 may confirm that the external servers 2201-2203 have performed the system boot operations successfully. In this example, the host server 210 may merely use the servers 2201-2203 for the following tasks. The said following tasks may include performing a platform reset to perform a boot procedure of the server system, and other following data calculations. In this example, other servers (such as the servers 2204-2205) linked after the server 2203 may be not used.

According to the server system and control method provided according to embodiments of the present invention, the host server may assure that each server of the external server chain has performed a corresponding system boot operation (e.g. a warm boot operation) normally. Hence, it may be avoided that some functional units of a server are not activated when booting the server system or performing other control operation. The control method provided by embodiments of the present invention may be feasible for a server system having a structure of a daisy chain or another similar structure, and is helpful for preventing the problems of the prior art and reducing the failure rate for the host server to control the server system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for controlling a server system, comprising:
    a host server sending a first reset signal to a first server;
    an $i_{th}$ server sending an $(i+1)_{th}$ reset signal to an $(i+1)_{th}$ server after the $i_{th}$ server receives an $i_{th}$ reset signal of an $(i-1)_{th}$ server;
    performing a system boot operation of an $n_{th}$ server after the $n_{th}$ server receives an $n_{th}$ reset signal;
    the $n_{th}$ server sending a first notification signal to an $(n-1)_{th}$ server after performing the system boot operation of the $n_{th}$ server;
    performing a system boot operation of an $(n-k)_{th}$ server after the $(n-k)_{th}$ server receives a $k_{th}$ notification signal of an $(n-k+1)_{th}$ server;
    the $(n-k)_{th}$ server sending a $(k+1)_{th}$ notification signal to an $(n-k-1)_{th}$ server after performing the system boot operation of the $(n-k)_{th}$ server;
    performing a system boot operation of the first server after the first server receives an $(n-1)_{th}$ notification signal of a second server; and
    the first server sending an $n_{th}$ notification signal to the host server after performing the system boot operation of the first server;
    wherein $1<i<n$, $0<k<(n-1)$, and i, k and n are positive integers.

2. The control method of claim 1, further comprising:
    the host server controlling the first server to the $n_{th}$ server if the host server has received the $n_{th}$ notification signal during a predetermined time interval.

3. The control method of claim 1, further comprising:
    the host server sending the first reset signal to the first server again if the host server fails to receive the $n_{th}$ notification signal during a predetermined time interval.

4. The control method of claim 1, wherein a system boot operation of each server comprises:
    rebooting power according to a power booting sequence when a set of functional units fails to be booted.

5. The control method of claim 1, wherein a system boot operation of each server comprises:
    booting a peripheral component interconnect express (PCIe) unit, a platform controller hub (PCH) unit, and/or a central processing unit (CPU).

6. The control method of claim 1, wherein:
    the $n_{th}$ server sending the first notification signal to the $(n-1)_{th}$ server after performing the system boot operation of the $n_{th}$ server is the $n_{th}$ server sending the first notification signal to the $(n-1)_{th}$ server after an $n_{th}$ predetermined time interval has elapsed since the $n_{th}$ server has received the $n_{th}$ reset signal;
    the $(n-k)_{th}$ server sending the $(k+1)_{th}$ notification signal to the $(n-k-1)_{th}$ server after performing the system boot operation of the $(n-k)_{th}$ server is the $(n-k)_{th}$ server sending the $(k+1)_{th}$ notification signal to the $(n-k-1)_{th}$ server after an $(n-k)_{th}$ predetermined time interval has elapsed since the $(n-k)_{th}$ server has received the $k_{th}$ notification signal; and
    the first server sending the $n_{th}$ notification signal to the host server after performing the system boot operation of the first server is the first server sending the $n_{th}$ notification signal to the host server after a first time interval has elapsed since the first server has received the $(n-1)_{th}$ notification signal.

7. The control method of claim 1, wherein:
    the $n_{th}$ server sending the first notification signal to the $(n-1)_{th}$ server after performing the system boot operation of the $n_{th}$ server is the $n_{th}$ server sending the first notification signal to the $(n-1)_{th}$ server after an $n_{th}$ predetermined time interval has elapsed since the $n_{th}$ server has received the $n_{th}$ reset signal, and after the system boot operation of the $n_{th}$ server has performed;
    the $(n-k)_{th}$ server sending the $(k+1)_{th}$ notification signal to the $(n-k-1)_{th}$ server after performing the system boot operation of the $(n-k)_{th}$ server is the $(n-k)_{th}$ server sending the $(k+1)_{th}$ notification signal to the $(n-k-1)_{th}$ server after an $(n-k)_{th}$ predetermined time interval has elapsed since the $(n-k)_{th}$ server has received the $k_{th}$ notification signal, and after the system boot operation of the $(n-k)_{th}$ server has performed; and
    the first server sending the $n_{th}$ notification signal to the host server after performing the system boot operation of the first server is the first server sending the $n_{th}$ notification signal to the host server after a first predetermined time interval has elapsed since the first server has received the $(n-1)_{th}$ notification signal, and after the system boot operation of the first server has performed.

8. The control method of claim 1, further comprising:
    sending a first stage calculation signal to the first server;
    the $i_{th}$ server sending an $(i+1)_{th}$ stage calculation signal to the $(i+1)_{th}$ server after the $i_{th}$ server receives an $i_{th}$ stage calculation signal of the $(i-1)_{th}$ server;
    the $n_{th}$ server sending a first stage reply signal to the $(n-1)_{th}$ server after the $n_{th}$ server receives an $n_{th}$ stage calculation signal of the $(n-1)_{th}$ server;
    the $(n-k)_{th}$ server sending a $(k+1)_{th}$ stage reply signal to the $(n-k-1)_{th}$ server after the $(n-k)_{th}$ server receives a $k_{th}$ stage reply signal of the $(n-k+1)_{th}$ server;
    the first server sending an $n_{th}$ stage reply signal to the host server after the first server receives an $(n-1)_{th}$ stage reply signal of the second server;
    the $(n-k)_{th}$ server generating an expected time for the $(n-k)_{th}$ server to receive the $k_{th}$ notification signal according to the $k_{th}$ stage reply signal;
    the first server generating an expected time for the first server to receive the $(n-1)_{th}$ notification signal according to the $(n-1)_{th}$ stage reply signal; and
    the host server generating an expected time for the host server to receive the $n_{th}$ notification signal according to the $n_{th}$ stage reply signal.

9. The control method of claim 8, further comprising:
    sending another first stage calculation signal to the first server if the host server fails to receive the $n_{th}$ notification signal at the expected time for the host server to receive the $n_{th}$ notification signal.

10. The control method of claim 8, further comprising:
    the $(n-k)_{th}$ server performing the system boot operation of the $(n-k)_{th}$ server if the $(n-k)_{th}$ server fails to receive the $k_{th}$ notification signal at the expected time for the $(n-k)_{th}$ server to receive the $k_{th}$ notification signal.

* * * * *